No. 738,878. PATENTED SEPT. 15, 1903.
H. BLUEHER.
SAND TRAP AND STRAINER.
APPLICATION FILED FEB. 16, 1903.
NO MODEL. 2 SHEETS—SHEET 1.

Witnesses
Inventor
Herman Blueher.
by James J. Sheehy
Attorney

No. 738,878. PATENTED SEPT. 15, 1903.
H. BLUEHER.
SAND TRAP AND STRAINER.
APPLICATION FILED FEB. 16, 1903.
NO MODEL. 2 SHEETS—SHEET 2.
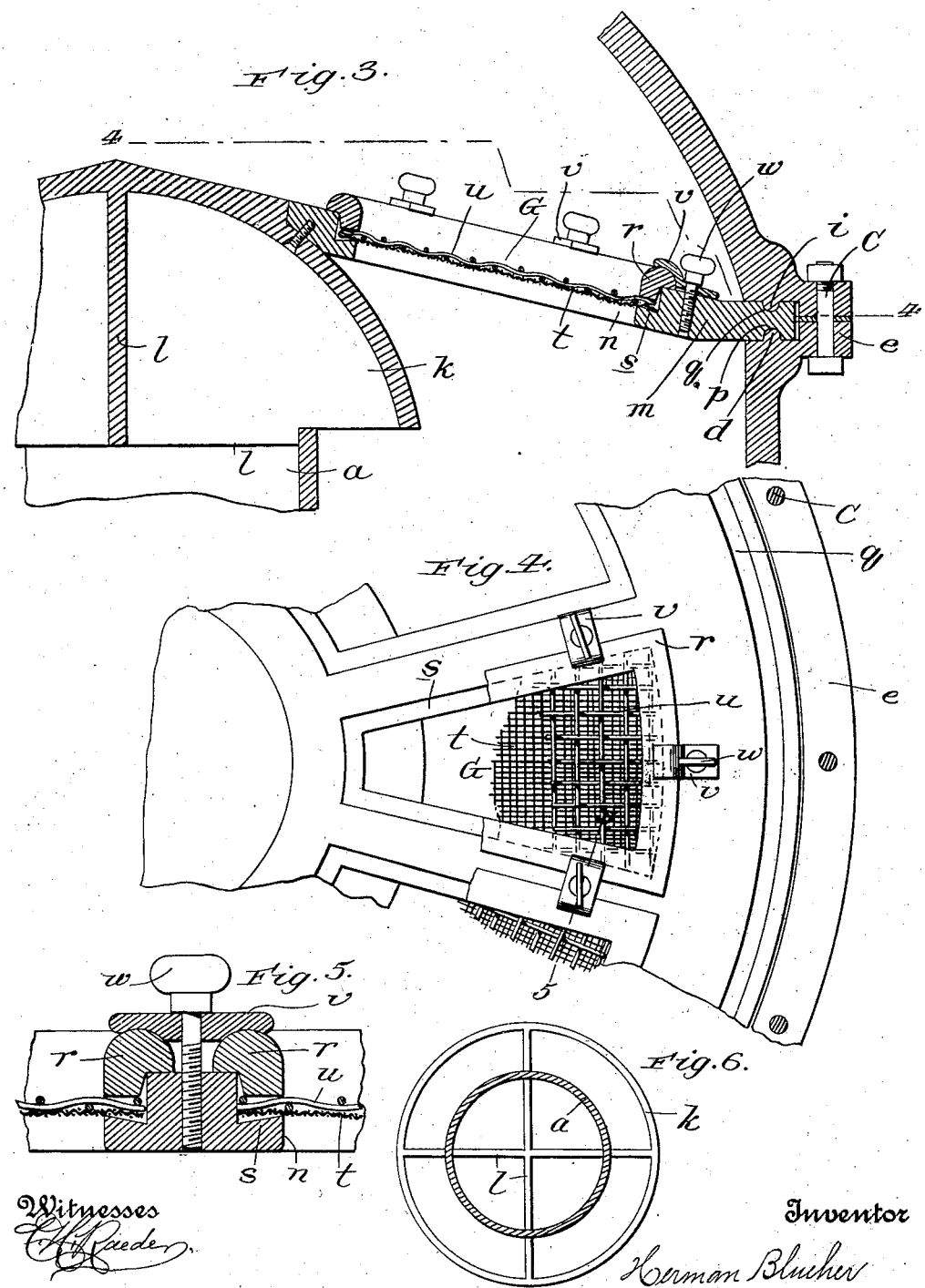

No. 738,878. Patented September 15, 1903.

UNITED STATES PATENT OFFICE.

HERMAN BLUEHER, OF ALBUQUERQUE, TERRITORY OF NEW MEXICO.

SAND TRAP AND STRAINER.

SPECIFICATION forming part of Letters Patent No. 738,878, dated September 15, 1903.

Application filed February 16, 1903. Serial No. 143,548. (No model.)

*To all whom it may concern:*

Be it known that I, HERMAN BLUEHER, a citizen of the United States, residing at Albuquerque, in the county of Bernalillo and Territory of New Mexico, have invented new and useful Improvements in Sand Traps and Strainers, of which the following is a specification.

My invention relates to sand traps and strainers for pumps, and has for its object to provide a simple and inexpensive device of that kind which is highly efficient in removing sand, gravel, and other foreign substances from water, crude oil, and other liquids, with a view of preventing such substances from injuring a pump and rendering the liquid more valuable, and is adapted to be readily cleared or discharged of collected substances and repaired without the necessity of disconnecting it from the pump.

With the foregoing in mind the invention will be fully understood from the following description and claims when taken in connection with the accompanying drawings, in which—

Figure 1:
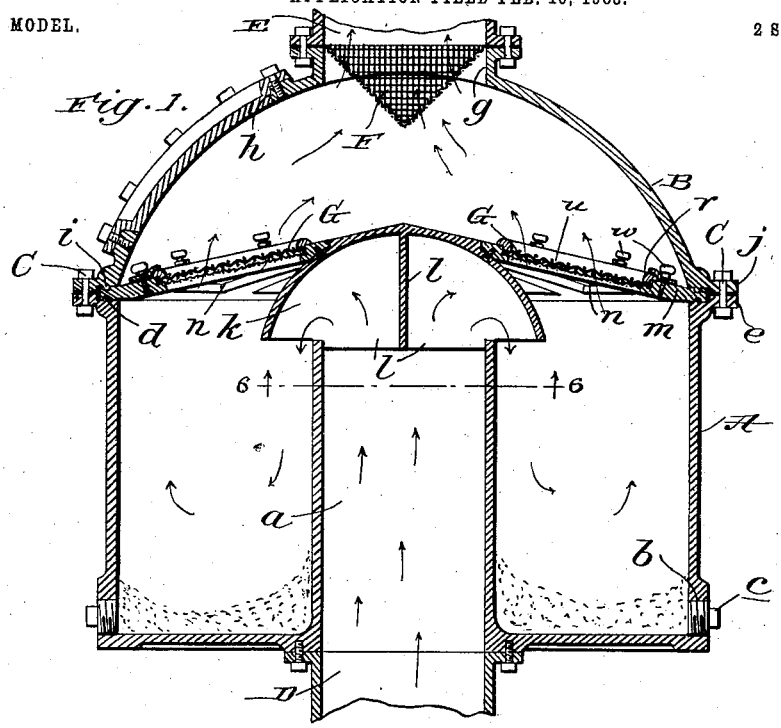
Figure 2:
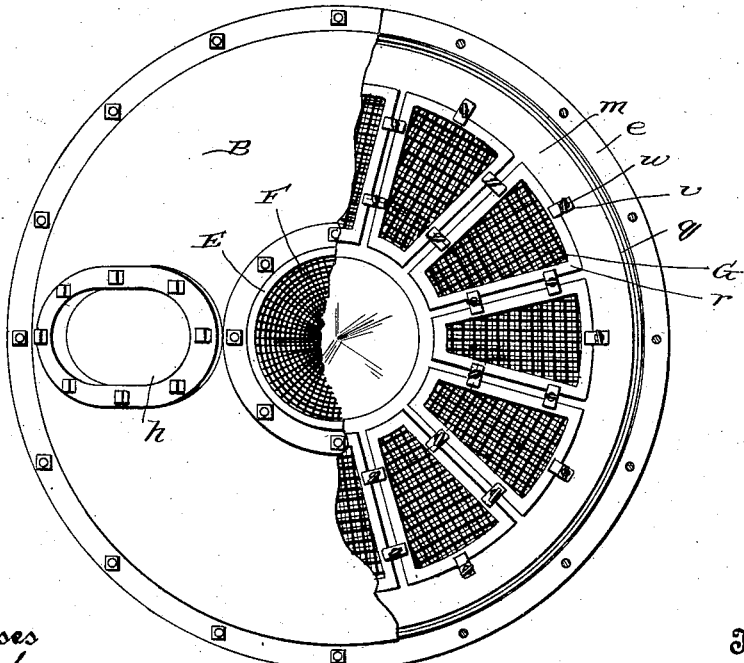

Figure 1 is a diametrical section of the sand trap and strainer constituting the preferred embodiment of my invention; Fig. 2, a plan view of the same with a portion of the upper member of the casing broken away; Fig. 3, an enlarged detail section illustrative of a portion of the diaphragm of the device; Fig. 4, a plan of the same; Fig. 5, an enlarged detail section taken in the plane indicated by broken line 5 5 of Fig. 4; and Fig. 6, a detail horizontal section taken in the plane indicated by the broken line 6 6 of Fig. 1.

Similar letters of reference designate corresponding parts in all of the several views of the drawings, referring to which—

A is the lower casing member of my improved device, which is preferably provided with a central vertical tube $a$, screw-tapped apertures $b$, normally closed by screw-plugs $c$, a circular rib $d$, and a flange $e$.

B is the upper casing member, which is provided with a central opening $g$ and a manhole $h$ and also with a circular rib $i$ and a flange $j$.

C C are bolts connecting the flanges of the casing members; D, a pipe connected to the bottom of the casing member A and adapted to be connected with a source of liquid-supply; E, a pipe connected to the casing member B and adapted to conduct a liquid to a pump, which I have deemed it unnecessary to illustrate; F, an inverted-cone-shaped screen secured between the casing member B and pipe E and having for its purpose to prevent any foreign substance that may find its way past the diaphragm, presently described, because of a broken screen therein from reaching the pump, and G the said diaphragm.

In the present and preferred embodiment of my invention the diaphragm comprises a dome-shaped deflector $k$, arranged over the upper end of tube $a$ and having webs $l$ at its under side which bear on said end of the tube, an annular frame $m$, which is fixedly connected to the deflector and is provided with a circular series of openings $n$ and also with lower and upper grooves $p$ $q$, which receive the ribs $d$ $i$, respectively, of the casing members, frames $r$, removably arranged on flanges $s$ around the openings $n$ and carrying screens $t$, and wire reinforcements $u$, disposed above said screens and having for their purpose to prevent the suction of the pump from drawing—*i.e.*, bulging—the screens upwardly, and clamping-plates $v$, connected to the frame $m$ by thumb-screws $w$ and engaging the screen-frames $r$, so as to hold the same in position.

In the practical operation of my improved device it will be seen that the liquid entering through the tube $a$ will strike the deflector $k$ and will be turned thereby down into the chamber afforded between the tube $a$ and the side wall of the casing member A also, that sand and other foreign substances in the liquid will gravitate to and remain at the bottom of the sand-chamber. The liquid, however, will be drawn by the suction of the pump up through the screens $t$ of diaphragm G and the screen F and in virtue of said screens will when it reaches the pump be entirely free of foreign substances.

It is frequently necessary in practice to clear the trap of the sand and other foreign substances which it collects. To do this, the operator has but to remove the screw-plugs $c$ and the cover of the manhole $h$ and turn a hose into the latter, when all foreign substances will be quickly forced from the trap through the apertures $b$.

When it is desired to remove one of the screen-frames $r$ from the diaphragm G to repair it or replace it with a new screen-frame, the workman has but to remove the manhole-cover, turn the diaphragm on the tube $a$ and between the casing members A B until the particular frame $r$ which it is desired to remove is below the manhole, disconnect said frame $r$ by loosening its complement of screws $w$, remove it through the manhole, introduce the new screen-frame through the manhole and connect it to the diaphragm, and replace the manhole-cover.

It follows from the foregoing that my improved trap and strainer may be readily cleared of collected sediment and the screens of its diaphragm may be readily repaired without the necessity of disconnecting the members of its casing or disconnecting said casing from the inlet and eduction pipes, which is an important desideratum.

I have entered into a detailed description of the construction and relative arrangement of the parts embraced in the present and preferred embodiment of my invention in order to impart a full, clear, and exact understanding of the same. I do not desire, however, to be understood as confining myself to such specific construction and arrangement of parts, as such changes or modifications may be made in practice as fairly fall within the scope of my invention as claimed.

Having described my invention, what I claim, and desire to secure by Letters Patent, is—

1. In a sand trap and strainer, the combination of a casing having an opening, and a diaphragm arranged in the casing, and comprising a plurality of removable screens; each of said screens being of a less size than the opening of the casing.

2. In a sand trap and strainer, the combination of a casing having an opening, and a diaphragm comprising a plurality of removable screens; said diaphragm being rotatably mounted in the casing, and each of the screens being of a less size than the opening in the casing.

3. In a sand trap and strainer, the combination of a casing having an inlet and an outlet, and a diaphragm arranged in the casing, between the inlet and outlet, and comprising a frame having a plurality of openings, screens removably arranged in the openings of the frame, and adjustable devices for normally holding the screens in said openings.

4. In a sand trap and strainer, the combination of a casing having an inlet and an outlet for liquid, and a diaphragm arranged in the casing, between the inlet and outlet, and comprising one or more flat screens of wire-gauze, and one or more flat, reticulated wire reinforcements, arranged at the opposite side of the gauze screen or screens, with reference to the inlet of the casing.

5. In a sand trap and strainer, the combination of a casing having an inlet and an outlet for liquid, a cone-shaped screen controlling the outlet, and arranged with its apex inward, and a diaphragm arranged in the casing, between the inlet and outlet, and comprising one or more flat screens of wire-gauze, and one or more flat, reticulated wire reinforcements, arranged at the opposite side of the gauze screen or screens, with reference to the inlet of the casing.

6. In a sand trap and strainer, the combination of a casing having a central, vertical inlet-tube, and also having an outlet, and a diaphragm arranged in the casing, and comprising a central deflector bearing on the upper end of the central, vertical tube, a frame connected to said deflector and the casing, and one or more screens carried by the frame.

7. In a sand trap and strainer, the combination of a casing having an inlet and an outlet for liquid, and also having an opening, and removable means for normally closing said opening, and a diaphragm arranged in the casing, between the inlet and outlet, and comprising a frame, and a plurality of screens detachably connected to said frame; said screens being smaller than the opening in the casing.

8. In a sand trap and strainer, the combination of a casing having an inlet and an outlet for liquid, and also having an opening, and removable means for normally closing said opening, and a diaphragm rotatably mounted in the casing, between the inlet and outlet, and comprising a frame, and a plurality of screens of less size than the opening in the casing, detachably connected to said frame.

9. In a sand trap and strainer, the combination of a casing having an inlet and an outlet for liquid, and also having an opening, and removable means for normally closing said opening, and a diaphragm rotatably mounted in the casing, between the inlet and outlet, and comprising a central deflector disposed over the inlet, a frame surrounding said deflector, and a plurality of screens of less size than the opening in the casing, detachably connected to said frame.

10. In a sand trap and strainer, the combination of a casing having a central vertical inlet-tube, and an outlet, and also having an opening, and a diaphragm rotatably mounted in the casing, and comprising a central deflector bearing on the upper end of the central, vertical tube, a frame surrounding said deflector, and a plurality of removable screens, of less size than the said opening in the casing, carried by the frame.

11. In a sand trap and strainer, the combination of a casing comprising upper and lower members connected together, and provided with circular ribs, said casing having an opening, and removable means for normally closing the same and a rotatable diaphragm arranged in the casing with its edge interposed between the casing members, and having circular grooves in its upper and lower sides receiving the ribs of said members.

12. In a sand trap and strainer, the combination of a casing comprising upper and lower members connected together, and provided with circular ribs; said casing having an inlet and an outlet for liquid, and an opening, and removable means for normally closing the same, and a rotatable diaphragm arranged in the casing, between the inlet and outlet; said diaphragm comprising a deflector disposed over the inlet, a frame surrounding the deflector, and interposed between the casing sections, and having circular grooves receiving the ribs of said sections, and also having a plurality of openings, and screens occupying said openings and detachably connected to the frame.

13. In a sand trap and strainer, the combination of a casing comprising an upper member, and a lower member having a central, vertical tube, and a diaphragm comprising a central deflector bearing on the upper end of the central, vertical tube, a frame connected to said deflector and secured between the members of the casing, and one or more screens carried by the frame.

In testimony whereof I have hereunto set my hand in presence of two subscribing witnesses.

HERMAN BLUEHER.

Witnesses:
EUGENE KEMPENICH,
FRANK J. McGINN.